(12) United States Patent
Echols-Jones et al.

(10) Patent No.: US 11,099,210 B2
(45) Date of Patent: Aug. 24, 2021

(54) FEEDBACK CORRECTION IN SUB-RESONANT TAPPING MODE OF AN ATOMIC FORCE MICROSCOPE

(71) Applicant: TRUSTEES OF TUFTS COLLEGE, Medford, MA (US)

(72) Inventors: Piers Echols-Jones, Medford, MA (US); William C. Messner, Amesbury, MA (US); Igor Sokolov, Medford, MA (US)

(73) Assignee: Trustees of Tufts College, Medford, MA (US)

( * ) Notice: Subject to any disclaimer, the term of this patent is extended or adjusted under 35 U.S.C. 154(b) by 215 days.

(21) Appl. No.: 16/481,759

(22) PCT Filed: Jan. 30, 2018

(86) PCT No.: PCT/US2018/015897
§ 371 (c)(1),
(2) Date: Jul. 29, 2019

(87) PCT Pub. No.: WO2018/140926
PCT Pub. Date: Aug. 2, 2018

(65) Prior Publication Data
US 2019/0391178 A1  Dec. 26, 2019

Related U.S. Application Data

(60) Provisional application No. 62/452,057, filed on Jan. 30, 2017.

(51) Int. Cl.
*G01Q 60/34* (2010.01)
*G01Q 10/02* (2010.01)
*G01Q 10/06* (2010.01)

(52) U.S. Cl.
CPC ............. *G01Q 60/34* (2013.01); *G01Q 10/02* (2013.01); *G01Q 10/065* (2013.01)

(58) Field of Classification Search
CPC ....... G01Q 60/34; G01Q 10/02; G01Q 10/065
USPC ............. 850/1, 2, 3, 4, 5, 6, 7, 8, 33, 37, 38
See application file for complete search history.

(56) References Cited

U.S. PATENT DOCUMENTS

| 5,902,928 | A | 5/1999 | Chen et al. |
| 10,794,930 | B2 * | 10/2020 | Sahin ..................... G01Q 60/30 |
| 2006/0230474 | A1 | 10/2006 | Mininni et al. |
| 2011/0167524 | A1 | 7/2011 | Hu et al. |

(Continued)

FOREIGN PATENT DOCUMENTS

WO         20160085927         6/2016

*Primary Examiner* — Nicole M Ippolito
(74) *Attorney, Agent, or Firm* — Occhiuti & Rohlicek LLP

(57) ABSTRACT

A method of carrying out sub-resonant tapping in an atomic force microscope includes causing a probe that is disposed above a sample to be translated in a direction parallel to a horizontal plane defined by the sample and to oscillate in a vertical direction that is perpendicular to the horizontal plane about an equilibrium line that is separated from the horizontal plane by a vertical offset. As a result, the probe repeatedly taps a surface of the sample. Each tap begins with a first contact of the probe on the surface followed by a progressive increase in force exerted by the sample on the probe until a peak force is attained. The vertical offset is controlled by relying at least in part on a feature other than the peak force as a basis for controlling the vertical offset.

20 Claims, 1 Drawing Sheet

(56) References Cited

U.S. PATENT DOCUMENTS

2011/0307980 A1    12/2011  Park et al.
2013/0276174 A1*  10/2013  Li ........................ G01Q 10/065
                                                                                  850/6
2015/0301080 A1*  10/2015  Proksch ................ G01Q 60/32
                                                                                 850/33

* cited by examiner

FEEDBACK CORRECTION IN SUB-RESONANT TAPPING MODE OF AN ATOMIC FORCE MICROSCOPE

CROSS REFERENCE TO RELATED APPLICATIONS

This application is the national stage of international application PCT/US2018/015897, filed on Jan. 30, 2018, which claims the benefit of the Jan. 30, 2017 priority date of U.S. Provisional Application No. 62/452,057, the contents of which are hereby entirely incorporated herein by reference.

STATEMENT OF GOVERNMENT SUPPORT

This invention was made with government support under grant 1144591 awarded by the National Science Foundation. The government has certain rights in the invention.

FIELD OF INVENTION

The invention relates to scanning probe microscopy, also known as atomic force microscopy, and in particular, to controlling a vertical offset of a probe as it scans along a surface.

BACKGROUND

Scanning probe microscopy, also known as atomic force microscopy, is a way to study force interactions between a probe and sample surface. It is broadly used to visualize features on a sample surface that have dimensions from hundreds of microns down to sub-nanometer scale.

In the sub-resonant tapping mode of atomic force microscopy, a probe attached to a cantilever oscillates above and below some equilibrium position. While the probe is below the equilibrium position, it can contact the sample surface. If this happens, the sample surface exerts a force on the probe. In doing so, it disturbs the oscillatory motion. This disturbance is useful for determining characteristics of the surface.

Ideally, the maximum force, which is also known as a "peak force," exerted by the surface on the probe should be constant at each point of contact between the probe and the sample surface. However, if the surface is anything other than flat and horizontal, this maximum force will not be constant. For example, if the probe goes over a valley, it is quite possible that the floor of the valley will be below the maximum extent of the probe's downward movement. In that case, the probe will not even contact the surface and the force will be zero. If the probe goes over a hill, contact occurs well before the maximum extent of the probe's downward movement. In that case, the force may be quite high.

One way to solve this problem is to vary the probe's equilibrium position. This variation in the equilibrium position defines a "bias." If the probe is about to go over a hill, the bias of the AFM cantilever (and consequently, the probe) should raise the equilibrium position just enough to avoid increasing the peak force on the probe, thereby keeping it constant. Conversely, if the probe is about to go over a valley, the bias should lower the equilibrium position just enough to avoid decreasing the peak force on the probe, again to keep it constant.

An obvious way to solve this problem is to provide the system with a map of the surface. This, after all, is how a cruise missile manages to fly low over topographically interesting terrain.

A difficulty with this solution is that there is generally no map available. In fact, if a map were already available, there would be no need to be probing the surface in the first place.

SUMMARY

In one aspect, the invention features a method of using an atomic force microscope. Such a method includes carrying out sub-resonant tapping in the atomic force microscope by causing a probe that is disposed above a sample to be translated in a direction parallel to a horizontal plane defined by the sample and to oscillate in a vertical direction that is perpendicular to the horizontal plane about an equilibrium line that is separated from the horizontal plane by a vertical offset. As a result, the probe repeatedly taps a surface of the sample. Each tap begins with a first contact of the probe with the surface. During the course of the tap, the sample exerts a force on the probe. This force increases until a peak force. Carrying out the sub-resonant tapping also includes controlling the vertical offset, or bias. Control over the vertical offset includes reliance, at least in part, on a feature other than the peak force as a basis for controlling the vertical offset.

In some practices of the invention, controlling the vertical offset includes controlling both a fine and a coarse actuator. The fine actuator moves the probe by at most a first extent and the coarse actuator moves the probe by at most a second extent that exceeds the first extent. Additionally, the fine actuator moves the probe more quickly than the coarse actuator. Among these practices are those in which controlling the fine actuator includes controlling the fine actuator during an interval, and, at the end of the interval, maintaining the fine actuator at a first position and controlling the coarse actuator. Practices of the invention include those in which this interval ends no later than attainment of the peak force and those in which it begins no earlier than the first contact of the probe with the surface. Also among these practices are those that include using the maintained first position as a basis of setting the vertical offset.

In other practices, relying at least in part on a feature other than the peak force as a basis for controlling the vertical offset includes relying on force exerted on the probe by the sample prior to attainment of the peak force.

In yet other practices, controlling the vertical offset includes causing an actuator to change the vertical offset in an attempt to maintain a constant peak force from tap to tap.

In another aspect, the invention features an apparatus that includes an atomic force microscope having a control system, a probe disposed on a cantilever, and a compound actuator configured to translate the probe in a direction parallel to a horizontal plane defined by a surface of a sample and to oscillate the probe about an equilibrium line that extends parallel to the horizontal plane and that is separated from the horizontal plane by a vertical offset. As the probe translates and oscillates, it repeatedly taps the sample. During each tap, the sample exerts a time-varying force on the probe. This time-varying force will have a peak value that defines a peak force. The control system controls the vertical offset in reliance at least in part on a force exerted on the probe by the surface. This force, however, is other than the peak force.

In some embodiments, the control system includes a compound control system that transitions between first and second states. In the first state, the compound control system includes both a first and second feedback loop. But in the second state, the second feedback loop is disconnected.

In other embodiments, the control system relies on force exerted on the probe by the sample prior to attainment of the peak force.

In yet other embodiments, the control system is configured to change the vertical offset in an attempt to maintain a constant peak force from tap to tap.

Also among the embodiments are those in which the compound actuator includes a fine actuator and a coarse actuator. The fine actuator moves the probe by at most a first extent and the coarse actuator moves the probe by at most a second extent that exceeds the first extent. Additionally, the fine actuator moves the probe more quickly than the coarse actuator. Among these are embodiments in which the control system controls the fine actuator during an interval, and, at the end of the interval, maintains the fine actuator at a first position and controls the coarse actuator. Such embodiments include those in which the control system ends the interval no later than attainment of the peak force and those in which it begins the interval no earlier than the probe's first contact with the surface. Also among the embodiments are those in which the control system uses the maintained first position as a basis of setting the vertical offset.

In another practice, the invention features controlling a vertical offset by relying at least in part on a feature other than a peak value of a force that results from interaction of a microscope's probe with a sample. This force is a time-varying force that results from having disposed the probe above the sample and causing the probe to simultaneously translate along a plane above the sample and to oscillate towards and away from the sample about an equilibrium line that is separated from the plane by the vertical offset so as to cause the probe to repeatedly tap a surface of the sample. The feature is one other than a peak value of the force. Each tap begins with a first contact of the probe with the surface. The taps occur at a frequency below the probe's resonance. During each of the taps, the force, which is exerted by the sample on the probe, increases until attainment of a peak force associated with the tap. Preferably, the microscope is a scanning prove microscope or an atomic force microscope and the method includes operating the microscope in sub-resonance tapping mode.

In some practices, controlling the vertical offset includes controlling fine and coarse actuators. The fine actuator moves the probe by at most a first extent and the coarse actuator moves the probe by at most a second extent. This second extent exceeds the first extent. Additionally, the fine actuator moves the probe more quickly than the coarse actuator.

In other practices, the feature is a feature of the force itself that is other than the peak value of the force. Such features may include the shape of the force curve as a function of time, including the time before it reaches its peak value, or the derivative of the force curve, or a definite integral of the same force curve, or the area under the force curve, or the rate of change of the force curve, or the instantaneous slope of the force curve at one or more locations.

In other embodiments, controlling the vertical offset includes controlling a first actuator during an interval and, upon completion of the interval, maintaining the first actuator at a first position and controlling a second actuator. The first actuator moves the probe more rapidly than the second actuator but by no more than a first extent that is less than a second extent by which the second actuator is able to move the probe.

In other practices, controlling the vertical offset includes controlling a first actuator prior to attainment of the peak force and, no later than having attained the peak force, maintaining the first actuator at a first position and controlling a second actuator. The first actuator moves the probe more rapidly than the second actuator but by no more than a first extent that is less than an second extent by which the second actuator is able to move the probe.

Also among the practices are those in which controlling the vertical offset includes commencing control of a fine actuator no earlier than first contact of the probe with the surface, and, after having controlled the probe with the fine actuator, relinquishing control to a coarse actuator and maintaining the fine actuator at a first position. The fine actuator moves the probe by at most a first extent. The coarse actuator moves the probe by at most a second extent that is greater than the first extent. However, the fine actuator moves the probe more quickly than the coarse actuator.

In other practices, controlling the vertical offset includes controlling a fine actuator during an interval and, upon completion of the interval, maintaining the fine actuator at a first position and controlling a coarse actuator, with this maintained first position serving as a basis for setting the vertical offset. The fine actuator moves the probe by at most a first extent and the coarse actuator moves the probe by at most a second extent that extent exceeds the first extent. In these practices, the fine actuator moves the probe more quickly than the coarse actuator.

In some practices, relying at least in part on a feature other than the peak force includes relying on force that the sample exerts on the probe prior attainment of the peak force.

Yet other practices include those in which controlling the vertical offset includes causing an actuator to change the vertical offset in an attempt to reduce variation in peak forces of the taps and those in which controlling the vertical offset includes causing an actuator to change the vertical offset in an attempt to maintain a constant peak force from tap to tap.

In another aspect, the invention features a microscope that includes a cantilever, a probe disposed on the cantilever, and a compound actuator that is configured to translate the probe along a plane defined by a surface of a sample and to oscillate the probe about an equilibrium line that extends parallel to the horizontal plane and that is separated from the horizontal plane by a vertical offset. While translating and oscillating, the probe repeatedly taps the sample at a sub-resonant frequency. During each tap, the sample exerts a force on the probe. This force is a time-varying force having a peak value. The microscope further includes a control system that is configured to control the vertical offset based at least in part on a feature other than the peak value.

In some embodiments, the compound actuator includes a fine actuator and a coarse actuator. The fine actuator moves the probe by at most a first extent. The coarse actuator moves the probe by at most a second extent that exceeds the first extent. Additionally, the fine actuator moves the probe more quickly than the coarse actuator moves it. Among these are embodiments in which the control system is configured to control the first actuator prior to attainment of the peak force and to thereafter maintain the first actuator at a first position and control the second actuator. In others of these embodiments, wherein the control system is configured to begin controlling the fine actuator no earlier than first contact of the probe with the surface, to maintain control of the fine actuator during a first interval, and at the end of the interval, to maintain the fine actuator at a first position and to begin controlling the coarse actuator. Also among these embodiments are those in which the control system is configured to control the fine actuator during an interval and, upon completion of the interval, to maintain the fine actuator at a particular position and to begin controlling the coarse actuator and to then use the maintained particular position as a basis of setting the vertical offset.

In some embodiments, the control system is configured to rely on force exerted on the probe by the sample prior to attainment of the peak force.

In other embodiments, the control system is configured to change the vertical offset in an attempt to maintain a constant peak force from tap to tap.

In yet other embodiments, the control system includes a compound control system that transitions between first and second states, wherein, in the first state, the compound control system includes a first and second feedback loop, and wherein, in the second state, the second feedback loop is disconnected.

Also among the embodiments are those in which the control system controls the vertical offset based at least in part on a feature of the force, the feature being a feature other than the peak value.

Embodiments further include those in which the microscope is an atomic force microscope and those in which it is a scanning probe microscope.

All devices and methods described herein are described in their non-abstract form. As such, these devices all have attributes of existence in the real world as distinct from their counterpart abstract forms that exist only in the non-real world. Descriptions of the methods and devices in their abstract form have been omitted. The claims therefore exclude coverage of abstract subject matter. As used herein, the term "abstract" refers to subject matter excluded from the scope of 35 USC 101 as of the filing date of this application and the term "non-abstract" consists of the set of all things that are not abstract. These and other features of the invention will be apparent from the accompanying detailed description and the figures, in which:

DETAILED DESCRIPTION

Figure 1:
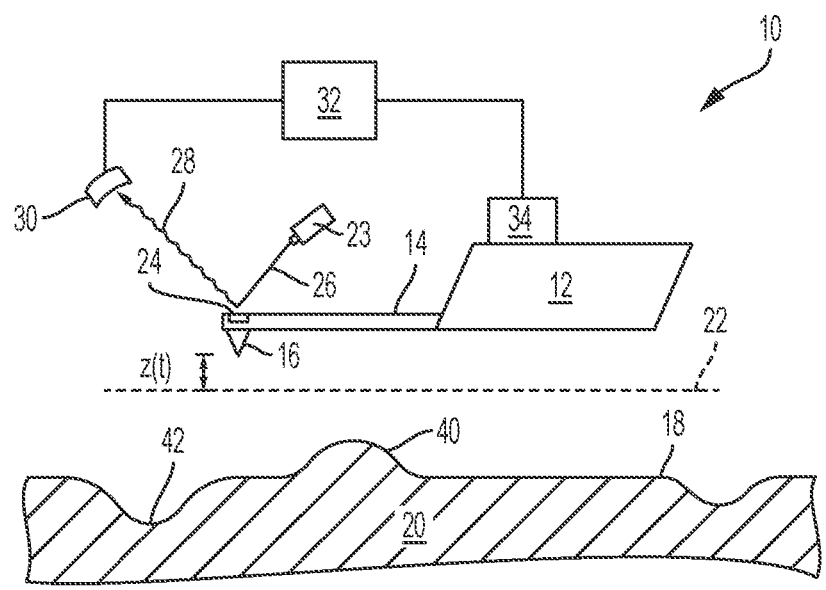
FIG. 1 shows a simplified diagram of one example of an atomic force microscope.

FIG. 1 shows a portion of an atomic force microscope 10 in which a scanner 12 supports a cantilever 14 to which is attached a probe 16. The scanner 12 moves the probe 16 along a scanning direction. In doing so the scanner 12 scans a region of a surface 18 of a sample 20.

Throughout this description, the scanner 12 is assumed to be moving the probe 16 while the sample 20 remains stationary. However, it is only relative motion that matters. Thus, it is possible for the probe 16 to remain stationary while the scanner 12 moves the sample 20. Or, it is also possible for the scanner 12 to move both the probe 16 and the sample 20. In all these cases, the control method and apparatus to be described operates in the same way.

As the scanner 12 moves the probe 16 in the scanning direction, it also oscillates it about an equilibrium line 22 in a vertical direction perpendicular to a datum of the sample's surface 18. This defines a function z(t) that represents the time-varying distance between the probe 16 and the equilibrium line 22. The frequency of the vertical oscillation, hereafter referred to as the "oscillation frequency," is less than the resonant frequency of the cantilever 14. As such, this scanning method is referred to as "sub-resonant tapping."

A portion of the cantilever 14 defines the probe 16. The cantilever 14 has a reflective surface. A portion of this reflective surface at the probe 16 will be referred to herein as the "mirror" 24. This mirror 24 reflects an illumination beam 26 that comes from a laser 23. A reflected beam 28 travels from the mirror 24 to a photo-detector 30, the output of which connects to a compound controller 32 that controls a compound actuator 34.

The probe's vertical movement translates into movement of the mirror 24, which then results in different parts of the photo-detector 30 being illuminated by the reflected beam 28. This results in a probe signal indicative of the probe's vertical movement. The compound controller 32 relies on this signal to control the compound actuator 34.

As the scanner 12 translates the probe 16, the probe 16 follows a path that would be, in the absence of any interference, a sinusoidal path having a peak and a trough. The distance between the peak and the trough along this path is equal to twice the oscillation's amplitude. This path also defines a spatial frequency that depends on both the oscillation frequency and the scanning speed.

During the course of each oscillation, and in particular, during that portion of the oscillation in which the probe 16 approaches its trough, the probe 16 contacts the sample 20. As a result, the probe 16 cannot actually reach its trough because the surface 18 will have interrupted its downward travel. This interruption is called a "tap." The moment at which the probe 16 would have reached its trough had the sample 20 not been present will be referred to herein as the moment when the probe 16 is "over" its trough.

Depending on the surface's topography, the probe 16 may tap the surface 18 just before it passes over its trough or well before it passes over its trough. For example, if the probe 16 happens to be passing over a bump 40 on the surface 18, it may tap the surface 18 well before it passes over its trough. This means that the surface 18 will exert a relatively high force on the probe 16. Conversely, if the probe 16 happens to be passing over a valley 42 on the surface 18, it will tap the surface 18 close to where it passes over its trough. In that case, the surface 18 will exert a relatively low force on the probe 16.

In general, it is desirable that, during each tap, the surface 18 always exerts the same force on the probe 16. This reduces artifacts in the resulting image. To achieve this, it is necessary to move the equilibrium line 22 up and down so that it can more or less track the surface 18 of the sample 20.

One way to do this is to use the force exerted by the sample 20 on the probe 16 as a feedback signal. If the force is too high, one knows that the equilibrium line 22 is too low, and therefore should be raised. Conversely, if the force is too low, one knows to that the equilibrium line 22 is too high and must be lowered.

A difficulty that arises with this scheme is that the feedback signal is only available when a tap occurs. This limits the rate at which the compound controller 32 can adjust for changes in surface's topography. To overcome this problem, the solution is to scan more slowly. Assuming a constant oscillation frequency, this will allow more taps per unit of distance travelled.

The situation is thus similar to that faced by one who, as a result of a deficiency in vision, must rely on tapping a cane to assess the coming topography. The feel of the cane provides a feedback signal that can be used to adjust one's gait in anticipation of forthcoming changes in topography. In this case, tapping more frequently per unit of distance travelled would reduce the likelihood of stumbling over an undetected obstacle.

The difficulty that arises when one attempts to sprint under these circumstances is that the feedback signal from the cane comes too infrequently to match the amount of distance traveled. In other words, the sampling frequency in the spatial domain becomes too low. This increases the likelihood of failing to detect an obstacle.

The slow scanning speed means that the time required to obtain an image can be prohibitively long. It is therefore desirable to find some way to scan more quickly.

One approach to solving this problem is to simply tap more frequently per unit of distance travelled. This would be analogous to one who begins tapping a cane very fast and breaks into a run. This faces several problems.

The first difficulty is that it is not always easy to move a large object quickly. To appreciate the difficulty, it is useful to attempt to tap a cane on the ground ten times per second instead of the more customary once per second.

The second difficulty is that computation and the necessary physical adjustments to compensate must all happen much faster.

A better solution arises from the recognition that there is something fundamentally different about the information provided by force feedback in an atomic force microscope 10. In particular, the tap that occurs in sub-resonant tapping mode includes more than just one instant of time at which the maximum force on the probe 16 is achieved. The tap is actually an extended process that includes a slow build-up to reach this maximum force. By using information in this slow build-up it is possible to obtain a head start in compensating for changes in topography. This, in turn, tends to reduce the artifacts that might otherwise arise from faster scanning.

In the case of a visually impaired person, the only feedback signal available occurs at the moment the cane strikes the ground. As alluded to above, this is not true in the atomic force microscope 10. This is because there can be a significant interval between the moment the probe 16 first contacts the sample 20 and the moment when the probe 16 passes over its trough. During this entire interval, the surface 18 exerts a force on the probe 16. However, this force is not constant. It begins at zero and grows until it reaches a maximum at the moment that the probe 16 passes over its trough.

Figure 2:
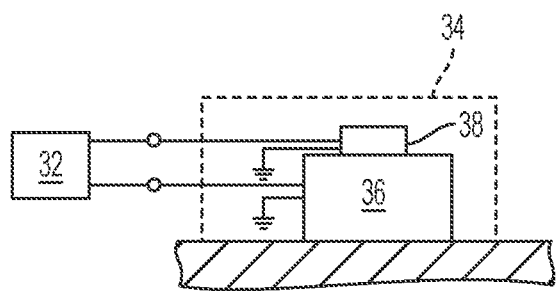
FIG. 2 shows details of the compound actuator shown in FIG. 1.

Although there are many ways to exploit this additional information, a particular embodiment for doing so is to provide the compound actuator 34 with a coarse actuator 36 and a fine actuator 38, as shown in FIG. 2.

The coarse actuator 36 can move the equilibrium line 22 only by relatively large amounts. However, it cannot do so very quickly. The fine actuator 38 can move the equilibrium line 22 only by small amounts. However, it can do so very quickly. Both the coarse actuator 36 and the fine actuator 38 connect to the compound controller 32 as shown in more detail in FIG. 3.

The coarse actuator 36 moves with a sinusoidal excitation having some offset. This offset governs the vertical position of the equilibrium line 22. The fine actuator 38 makes fine movements in an effort to achieve a constant force at the moment that the probe 16 passes over its trough. In doing so, it makes fine adjustments to the vertical position of the equilibrium line 22.

Figure 3:
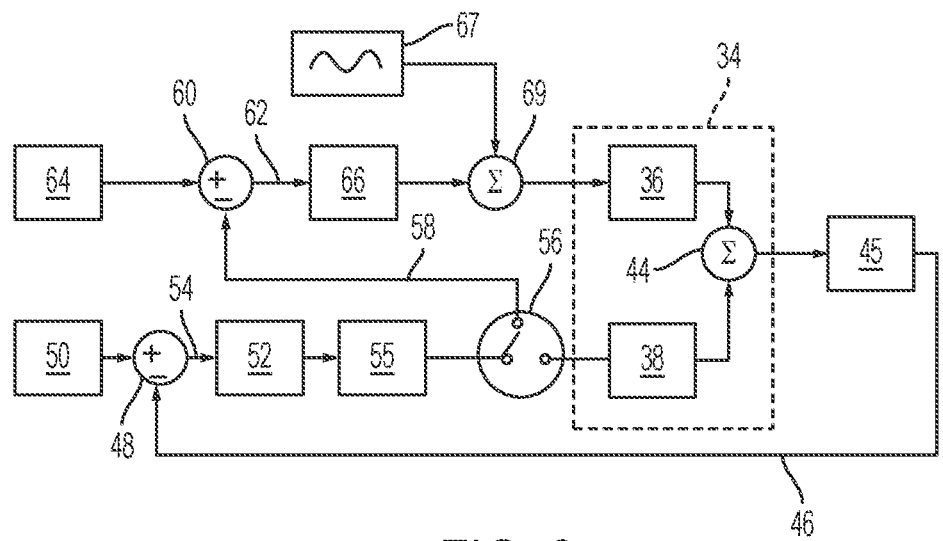
FIG. 3 shows details of the compound controller controlling the coarse and fine actuators of the compound actuator shown in FIG. 2.

FIG. 3 shows the coarse actuator 36 and the fine actuator 38 whose motions can be modeled as summing together at a first summer 44. When the probe 16 contacts the surface 18, the output of the first summer 44 is the actual probe deflection 45. This probe deflection 45 can be used as a first feedback signal 46.

A first differencing unit 48 compares this first feedback signal 46 with a reference trajectory 50. The resulting first difference 54 is provided to a fine-actuator controller 52. Depending on the state of a switch 56, the fine-actuator controller 52 uses this first difference 54 either as a basis for controlling the fine actuator 38 or as a second feedback signal 58, which it provides to a second differencing unit 60. A sample-and-hold block 55 between at the output of the fine-actuator controller 52 makes the last value output by the fine-actuator controller 52 available for use as the second feedback signal 58.

When this second feedback signal 58 becomes available to the second differencing unit 60, the second differencing unit 60 evaluates a second difference 62, which is a difference between a reference signal 64 and the second feedback signal 58. This is provided to a coarse-actuator controller 66, the output of which is added to a sinusoidal waveform 67 at a second summer 69 before being used as a basis for adjusting a vertical offset of the equilibrium line 22.

The switch 56 defines a control window during which the fine actuator 38 is actually being used. This would correspond to an interval between the probe's first contact with the substrate and the time the probe's passage over its trough. During this interval, the switch 56 connects the fine-actuator controller 52 to the fine actuator 38. Otherwise, the switch 56 connects the fine-actuator controller 52 to the second differencing unit 60.

Referring to FIG. 3, a control method begins with the switch 56 connecting the fine-actuator controller 52 to the fine actuator 38. This opens a control window that allows the fine-actuator controller 52 to cause the fine actuator 38 to follow the reference trajectory 50. This occurs at or just before the probe's first contact with the sample 20, well before it passes over its trough.

As the probe 16 passes over the trough, fine actuator holds its position. Then, the switch 56 changes state so that it connects the fine-actuator controller 52 to the coarse-actuator controller 66. This closes the control window. The output of the fine-actuator controller 52 as the probe 16 passed over the trough thus becomes the second feedback signal 58 for the coarse-actuator controller 66.

The second differencing unit 60 obtains the difference between the second feedback signal 58 and a reference signal 64. This difference is provided to the coarse-actuator controller 66, which then uses it to correct the position of the equilibrium line 22.

In effect, the fine-actuator controller 52 works to cause the probe 16 to follow the desired trajectory. The extent to which the fine-actuator controller 52 actually has to work to do this measures how incorrectly set the equilibrium line 22 is. The fine-actuator controller 52 provides a measure of this extent to the coarse-actuator controller 66, which then uses it to correct the vertical offset of the equilibrium line 22. This gives the compound controller 32 a head-start in anticipating the topography at the next tap, and thus permits the faster scanning without a concomitant likelihood of controller error.

The coarse actuator 36 and the fine actuator 38 thus have two distinct roles. The coarse actuator 36 moves with sinusoidal excitation of constant frequency at a vertical offset. The fine actuator 38 tracks a desired probe displacement trajectory in an effort to achieve a consistent peak force as the probe 16 passes over its trough.

To account for the probe 16 moving in and out of contact with the sample 20, the compound controller 32 windows the fine actuator's activity. This means that feedback control of either the fine actuator 38 or coarse actuator 36 is only active during a portion of the tapping interval.

To account for the changing surface profile between taps, the compound controller 32 uses the fine actuator's output at the end of the control window as a basis for updating the offset of the coarse actuator 36 between the time the probe 16 pulls away from the surface 18 and the start of the next control window.

The compound controller 32 thus exploits a thus-far unexploited feature of the force curve that results whenever the probe 16 contacts the surface 18. In particular, the compound controller 13 exploits the development of force on the probe 16 over time. Instead of relying only on the peak force on this force curve, the compound controller 32 makes use of other features of the force curve. These other features include, without limitation, any one or more of a depression portion, an approach portion, and a jump-in portion.

Unlike conventional atomic force microscopes, which rely on multiple taps per pixel of the image, an atomic force microscope 10 as described herein requires only a single tap per pixel to generate the feedback signal needed to maintain the peak force. This eliminates the time needed for all the extra taps, thus permitting much faster scanning.

Having described the invention and a preferred embodiment thereof, what is claimed as new and secured by Letters Patent is:

1. A method comprising controlling a vertical offset by relying at least in part on a feature other than a peak value of a force that results from interaction of a microscope's probe with a sample, said force being a time-varying force and said feature being a feature other than a peak value of said force, wherein said force results from having disposed said probe above said sample and causing said probe to simultaneously translate along a plane above said sample and to oscillate towards and away from said sample about an equilibrium line that is separated from said plane by said vertical offset so as to cause said probe to repeatedly tap a surface of said sample at a frequency below said probe's resonance, wherein each tap begins with a first contact of said probe with said surface, and wherein, during each of said taps, said force, which is exerted by said sample on said probe, increases until a peak force associated with said tap has been attained.

2. The method of claim 1, wherein controlling said vertical offset comprises causing an actuator to change said vertical offset in an attempt to reduce variation in peak forces of said taps.

3. The method of claim 1, wherein controlling said vertical offset comprises controlling a first actuator during an interval and, upon completion of said interval, maintaining said first actuator at a first position and controlling a second actuator, wherein said first actuator moves said probe more rapidly than said second actuator but by no more than a first extent that is less than a second extent by which said second actuator is able to move said probe.

4. The method of claim 1, wherein controlling said vertical offset comprises controlling a fine actuator and controlling a coarse actuator, wherein said fine actuator moves said probe by at most a first extent and said coarse actuator moves said probe by at most a second extent, wherein said second extent exceeds said first extent, and wherein said fine actuator moves said probe more quickly than said coarse actuator.

5. The method of claim 1, wherein relying at least in part on a feature other than said peak force comprises relying on force that said sample exerts on said probe prior attainment of said peak force.

6. The method of claim 1, wherein controlling said vertical offset comprises controlling a first actuator prior to attainment of said peak force and, no later than having attained said peak force, maintaining said first actuator at a first position and controlling a second actuator, wherein said first actuator moves said probe more rapidly than said second actuator but by no more than a first extent that is less than an second extent by which said second actuator is able to move said probe.

7. The method of claim 1, wherein controlling said vertical offset comprises commencing control of a fine actuator no earlier than first contact of said probe with said surface, and, after having controlled said probe with said fine actuator, relinquishing control to a coarse actuator and maintaining said fine actuator at a first position, wherein said fine actuator moves said probe by at most a first extent, wherein said coarse actuator moves said probe by at most a second extent, said second extent exceeding said first extent, wherein said fine actuator moves said probe more quickly than said coarse actuator.

8. The method of claim 1, wherein controlling said vertical offset comprises causing an actuator to change said vertical offset in an attempt to maintain a constant peak force from tap to tap.

9. The method of claim 1, wherein controlling said vertical offset comprises controlling a fine actuator during an interval and, upon completion of said interval, maintaining said fine actuator at a first position and controlling a coarse actuator, wherein said fine actuator moves said probe by at most a first extent and said coarse actuator moves said probe by at most a second extent, wherein said second extent exceeds said first extent, and wherein said fine actuator moves said probe more quickly than said coarse actuator, said method further comprising using said maintained first position as a basis of setting said vertical offset.

10. The method of claim 1, wherein controlling said vertical offset comprises relying at least in part on a feature of said force.

11. An apparatus comprising a microscope, said microscope comprising a cantilever, a probe disposed on said cantilever, a compound actuator that is configured to translate said probe along a plane defined by a surface of a sample and to oscillate said probe about an equilibrium line that extends parallel to said horizontal plane and that is separated from said horizontal plane by a vertical offset, wherein, while translating and oscillating, said probe repeatedly taps said sample at a frequency that is below resonance of said probe, and wherein, during each tap, said sample exerts a force on said probe, said force being a time-varying force having a peak value, and wherein said microscope further comprises a control system that is configured to control said vertical offset based at least in part on a feature other than said peak value.

12. The apparatus of claim 11, wherein said compound actuator comprises a fine actuator and a coarse actuator, wherein said fine actuator moves said probe by at most a first extent and said coarse actuator moves said probe by at most a second extent, wherein said second extent exceeds said first extent, and wherein said fine actuator moves said probe more quickly than said coarse actuator.

13. The apparatus of claim 11, wherein said compound actuator comprises first and second actuators, wherein said control system is configured to control said first actuator prior to attainment of said peak force and to thereafter maintain said first actuator at a first position and control said second actuator, wherein said first actuator moves said probe by at most a first extent and said second actuator moves said probe by at most a second extent that exceeds said first extent, and wherein said first actuator moves said probe more quickly than said second actuator.

14. The apparatus of claim 11, wherein said compound actuator comprises a fine actuator and a coarse actuator, wherein said control system is configured to begin controlling said fine actuator no earlier than first contact of said probe with said surface, to maintain control of said fine actuator during a first interval, and at the end of said interval, to maintain said fine actuator at a first position and to begin controlling said coarse actuator, wherein said fine actuator moves said probe by at most a first extent and said coarse actuator moves said probe by at most a second extent, wherein said second extent exceeds said first extent, and wherein said fine actuator moves said probe more quickly than said coarse actuator.

15. The apparatus of claim 11, wherein said compound actuator comprises a fine actuator and a coarse actuator, wherein said control system is configured to control said fine actuator during an interval and, upon completion of said interval, to maintain said fine actuator at a particular position and to begin controlling said coarse actuator, wherein said control system is configured to use said maintained particular position as a basis of setting said vertical offset, wherein said fine actuator moves said probe by at most a first extent and said coarse actuator moves said probe by at most a second extent, wherein said second extent exceeds said first extent, and wherein said fine actuator moves said probe more quickly than said coarse actuator.

16. The apparatus of claim 11, wherein said control system is configured to rely on force exerted on said probe by said sample prior to attainment of said peak force.

17. The apparatus of claim 11, wherein said control system is configured to change said vertical offset in an attempt to maintain a constant peak force from tap to tap.

18. The apparatus of claim 11, wherein said control system comprises a compound control system that transitions between first and second states, wherein, in said first state, said compound control system comprises a first and second feedback loop, and wherein, in said second state, said second feedback loop is disconnected.

19. The apparatus of claim 11, wherein said compound actuator comprises a fine actuator and a coarse actuator, wherein said fine actuator moves said probe by at most a first extent and said coarse actuator moves said probe by at most a second extent, wherein said second extent exceeds said first extent, wherein said fine actuator moves said probe more quickly than said coarse actuator, and wherein said control system is configured to control said fine actuator during an interval, and at the end of said interval, to maintain said fine actuator at a first position and to control said coarse actuator.

20. The apparatus of claim 11, wherein said control system is configured to control said vertical offset based at least in part on a feature of said force, said feature being a feature other than said peak value.

* * * * *